United States Patent [19] | [11] 4,124,655
Koehnlein et al. | [45] Nov. 7, 1978

[54] ELECTRICAL INSULATING COMPOSITIONS BASED ON ETHYLENE/VINYL ACETATE COPOLYMERS

[75] Inventors: Ernst Koehnlein; Rudolf Glaser, both of Ludwigshafen; Ludwig Koessler, Gruenstadt, all of Fed. Rep. of Germany

[73] Assignee: BASF Aktiengesellschaft, Ludwigshafen, Fed. Rep. of Germany

[21] Appl. No.: 758,434

[22] Filed: Jan. 11, 1977

[30] Foreign Application Priority Data

Jan. 24, 1976 [DE] Fed. Rep. of Germany ....... 2602689

[51] Int. Cl.$^2$ ....................... C08F 263/04; C08K 5/34
[52] U.S. Cl. ....................... 260/878 R; 260/45.8 NW
[58] Field of Search ................... 260/878 R, 45.8 NW

[56] References Cited

U.S. PATENT DOCUMENTS

| | | | |
|---|---|---|---|
| 3,047,521 | 7/1962 | Harman | 260/45.8 NW |
| 3,244,683 | 4/1966 | Kline | 260/45.8 NW |
| 3,296,189 | 1/1967 | Eastman | 526/57 |
| 3,639,529 | 2/1972 | MacKenzie, Jr. et al. | 260/45.8 NW |
| 3,901,849 | 8/1975 | Dodson et al. | 260/45.8 NW |
| 4,018,852 | 4/1977 | Schober | 260/878 R |

*Primary Examiner*—Alan Holler
*Attorney, Agent, or Firm*—Keil, Thompson & Shurtleff

[57] ABSTRACT

Electrical insulating compositions consisting of an ethylene/vinyl acetate copolymer containing from 0.5 to 9.5 percent by weight of vinyl acetate units, from 0.1 to 2.0 percent by weight of polymerized 2,2,4-trimethyl-1,2-dihydroquinoline, from 0.5 to 5 percent by weight of a triallyl cyanurate and, optionally, up to 0.1 percent by weight of sulfur. The compositions can be cross-linked, with high yield, by treatment with high energy radiation.

1 Claim, No Drawings

ELECTRICAL INSULATING COMPOSITIONS BASED ON ETHYLENE/VINYL ACETATE COPOLYMERS

The present invention relates to electrical insulating compositions which consist of copolymers of ethylene with vinyl acetate, contain an antioxidant and crosslinking agents, and can be crosslinked with high yield by means of high energy radiation.

The use of irradiated ethylene copolymers as insulating compositions for electrical cables and lines has been disclosed. However, the conventional insulating compositions on the one hand require high radiation doses for crosslinking, whilst on the other hand they tend to embrittle in use, due to the high temperatures which the cable insulation reaches, thereby restricting the scope for employing the above materials.

Attempts have also been made to use special ethylene copolymer compositions, which have been irradiated and which contain relatively large amounts of fillers, as electrical insulating compositions. These compositions exhibit good flexibility properties and are also distinguished by low cost, the latter being the result of using large amounts of fillers, ie. not less than 40 percent by weight. However, these compositions also tend to embrittle and to suffer stress cracking.

It is an object of the present invention to provide electrical insulating compositions which do not suffer from the above disadvantages, ie. which can be crosslinked with high radiation yield and which, after crosslinking, suffer little change in their mechanical and electrical properties as a result of aging at elevated temperatures.

We have found that this object is achieved by electrical insulating compositions consisting of (A) an ethylene/vinyl acetate copolymer which contains, as copolymerized units, from 99.5 to 90.5 percent by weight of ethylene and from 0.5 to 9.5 percent by weight of vinyl acetate, the sum of these percentages by weight being 100, and the melt index of the copolymer being from 0.2 to 5 g/10 min, (B) from 0.1 to 2.0 percent by weight, based on (A), of polymerized 2,2,4-trimethyl-1,2-dihydroquinoline having a softening point of from 108° to 118° C. and a molecular weight of the order of magnitude of 500, (C) from 0.5 to 5 percent by weight, based on (A), of triallyl cyanurate and (D) from 0 to 0.1 percent by weight, based on (A), of sulfur, with or without the addition of conventional stabilizers based on aromatic amine compounds, and fillers, in conventional amounts.

It is an advantage of the compositions according to the invention that they can be crosslinked sufficiently with a low radiation dose and that, in the crosslinked state, they exhibit good resistance to heat aging and hence do not tend to embrittle, possess a high melting point, are relatively cheap and exhibit a high degree of crosslinking, ie. a low swelling capacity and a high gel content.

Electrical insulating compositions are to be understood, for the purposes of the invention, as being extrudable plastics compositions which are used for insulating electrical cables and lines. After having been crosslinked, the compositions of the invention are preferentially suitable for low voltage (1-10 kV) cable and wire insulation.

According to the invention, the ethylene/vinyl acetate copolymer should contain from 0.5 to 9.5, preferably from 2 to 5, percent by weight of vinyl acetate as copolymerized units. The proportion of ethylene in the copolymer is from 90.5 to 99.5 percent by weight, preferably from 95 to 98 percent by weight.

The above type of ethylene/vinyl acetate copolymer can be manufactured at very little additional cost compared to a homopolymer of ethylene, whilst if the vinyl acetate content is increased further the manufacturing costs increase greatly. Furthermore, a higher vinyl acetate content would lower the melting point of the crosslinked copolymer.

The melt indices of the non-irradiated ethylene/vinyl acetate copolymers are from 0.2 to 5, preferably from 0.4 to 3.5 [g/10 min] (determined according to ASTM D 1238-65 T at 190° C. under a load of 2.16 kg).

Before crosslinking by radiation, the ethylene/vinyl acetate copolymer contains from 0.1 to 2.0, preferably from 0.2 to 0.6, percent by weight, based on the copolymer, of polymerized 2,2,4-trimethyl-1,2-dihydroquinoline. Compounds of the latter type are well-known and are marketed, eg., by Monsanto Chemical Company under the tradename "Flectol H" (compare Technical Report IC/RC-25 from Monsanto Europe S.A.).

The polymerized 2,2,4-trimethyl-1,2-dihydroquinoline is derived from the monomeric compound of the structural formula

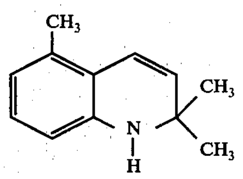

The polymerized product is a light brown powder having a softening point of 180°-118° C. and a molecular weight of the order of magnitude of 500, and is characterized by the formula

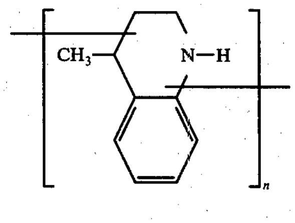

where $n$ is from 2 to 5.

Polymeric 2,2,4-trimethyl-1,2-dihydroquinoline is a conventional effective antioxidant and, according to the present invention, improves the aging resistance of the ethylene/vinyl acetate copolymers.

In order to increase the aging resistance of the ethylene/vinyl acetate copolymer, it has proved particularly advantageous to add small amounts of sulfur, additionally to the above antioxidant, to the copolymer. The amount of sulfur is at most 0.1 percent by weight, preferably from 0.02 to 0.08 percent by weight, based on the amount of ethylene copolymer.

The ethylene/vinyl acetate copolymer furthermore contains from 0.5 to 5.0 percent by weight, preferably from 1.0 to 3.0 percent by weight, based on copolymer, of triallyl cyanurate, in order to improve the radiation yield of crosslinking of the copolymer. Triallyl cyanurate is the trimeric allyl ester of cyanuric acid, prepared from cyanuric anhydride and alcohol. The improvement of the degree of crosslinking of a polymer mixture on treatment with high energy radiation in the presence of a low molecular weight compound, which contains at least two non-conjugated double bonds in the molecule, is a conventional process.

The mixture according to the invention may furthermore contain conventional stabilizers based on aromatic amine compounds and conventional fillers, in conventional amounts. A particularly suitable amine which may be used in p-phenylenediamine, employed in amounts of from 0.2 to 1 percent by weight, based on the amount of copolymer. Examples of fillers which may be present in the mixtures are chalk, kaolin, carbon black or talcum, in amounts of up to 30 percent by weight, based on the copolymer.

It is preferred to achieve a gel content of from 50 to 85 percent by weight, preferably from 70 to 75 percent by weight, when irradiating the ethylene/vinyl acetate copolymer with high energy radiation in the presence of the additives according to the invention. High energy radiation, for the purposes of the invention, means neutrons or $\gamma$-rays or, preferably, high-speed electrons; the irradiation dose is as low as possible, in particular from 5 to 12, preferably from 8 to 10, Mrad. The degree of crosslinking of the ethylene/vinyl acetate copolymer after irradiation of the latter is determined by determining the gel content and the swelling ratio (compare Kunststoffe 60 (1970 (11) 885). Advantageously, the content of gel insoluble in boiling xylene should be from 50 to 85 percent by weight, and the weight of a sample which has been allowed to swell in xylene at 140° C. for 2 hours should be from 6 to 10 times the weight of the unswollen sample.

The aging resistance is measured by storing samples in air at 150° C. and subjecting them to a tensile tear test at regular intervals. The resistance is recorded as the storage time in days (*d*), which results in the elongation at break being lowered to 50 percent of the initial value.

If ethylene/vinyl acetate copolymers are irradiated in the absence of the additives mentioned above, the radiation yield, in respect of the degree of crosslinking achieved, is only good if the proportion of vinyl acetate, present as copolymerized units, is high. If, however, the above additives are added to the copolymer in the ratios claimed, highly crosslinked copolymer mixtures can be obtained from the above mixtures even at low irradiation doses, ie. the radiation yield is greatly increased.

In the Examples which follow, parts are by weight.

EXAMPLES 1 TO 3 AND COMPARATIVE EXAMPLES 4 TO 8

*b* parts of polymerized 2,2,4-trimethyl-1,2-dihydroquinoline ("Flectol H"), *c* parts of triallyl cyanurate and *d* parts of sulfur are added — using a dry mixing process — to 100 parts of granules consisting of an ethylene/vinyl acetate copolymer in which the vinyl acetate content (a) is a percent by weight, based on the polymer. The additives are homogeneously distributed in the polymer by subjecting them to a single extrusion.

Test specimens are produced from the mixture in a press and are irradiated with high-speed electrons (2.5 MeV), using a dose of 10 Mrad.

The Table shows the degree of crosslinking, aging resistance and melting point of the samples achieved, by the measures described above, for Examples 1 to 3 and Comparative Examples 4 to 8. Specifically, the columns of the Table show the following: Q: the swelling ratio (cf. Kunststoffe 60 (1970) (11) 885) G: the gel content (cf. Kunststoffe 60 (1970) (11) 885) F: the melting point (determined by differential calorimetry with samples of 1 mg, and rates of heating of 32° C./min) A: the aging resistance in days (d).

TABLE

| Example | a | b | c | d | Q | G % | F ° C | A d |
|---|---|---|---|---|---|---|---|---|
| 1 | 2.3 | 0.6 | 2.0 | 0 | 9.0 | 72 | 104 | 20 |
| 2 | 2.3 | 0.2 | 2.0 | 0.05 | 8.5 | 73 | 104 | 20 |
| 3 | 5.2 | 0.2 | 2.0 | 0.05 | 7.3 | 77 | 100 | 20 |
| 4 | 0 | 0 | 0 | 0 | 15 | 56 | 106 | 1 |
| 5 | 0 | 0.2 | 2.0 | 0.05 | 9.2 | 67 | 105 | 10 |
| 6 | 2.3 | 0 | 0 | 0 | 15 | 62 | | 1 |
| 7 | 2.3 | 0.2 | 0 | 0.05 | 20 | 60 | 104 | 20 |
| 8 | 12 | 0.2 | 2.0 | 0.05 | 7.0 | 80 | 85 | 20 |

It can be seen from Examples 1 to 8 that products which exhibit good crosslinking in addition to good aging characteristics and a high melting point are only obtained with the mixtures according to the invention.

We claim:

1. An electrical insulating composition consisting of (A) an ethylene/vinyl acetate copolymer which consists of, as copolymerized units, from 99.5 to 90.5 percent by weight of ethylene and from 0.5 to 9.5 percent by weight of vinyl acetate, the sum of the percentages by weight being 100 and the melt index of the copolymer being from 0.2 to 5 g/10 min., (B) from 0.1 to 2.0 percent by weight, based on A), of polymerized 2,2,4-trimethyl-1,2-dihydroquinoline having a softening point of from 108 to 118° C., (C) from 0.5 to 5 percent by weight, based on A), of triallyl cyanurate, and (D) from 0 to 0.1 percent by weight, based on A), of sulfur.

* * * * *